Aug. 26, 1969 W. M. HAESSLER 3,463,233
METHOD OF EXTINGUISHING DEEP FAT FIRES
Filed May 15, 1967
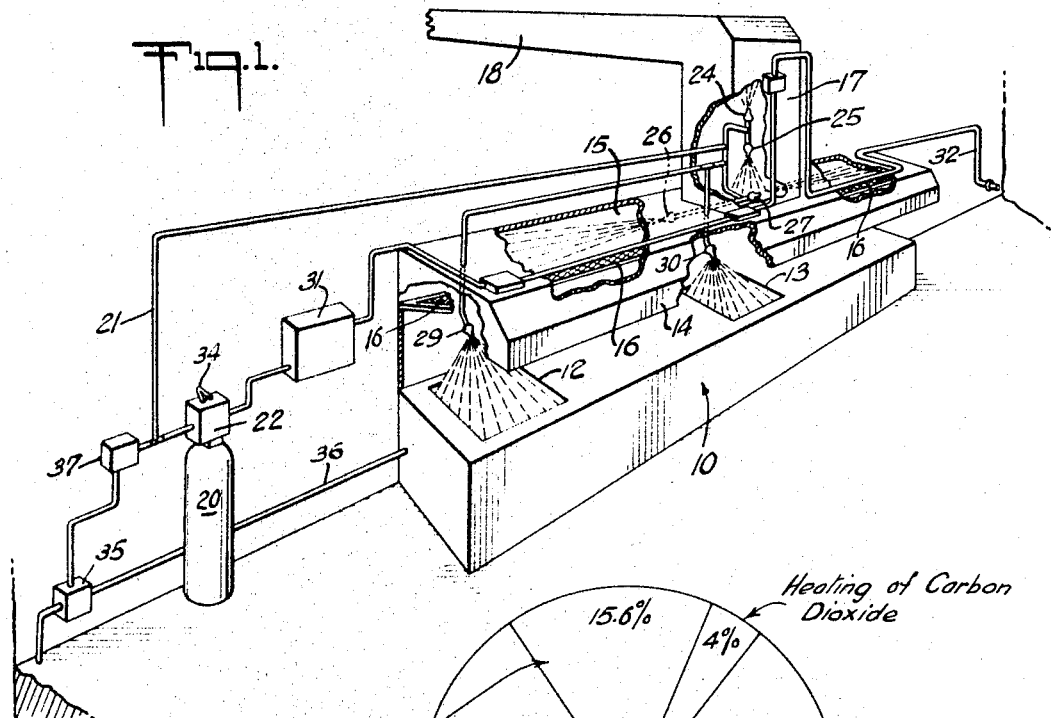
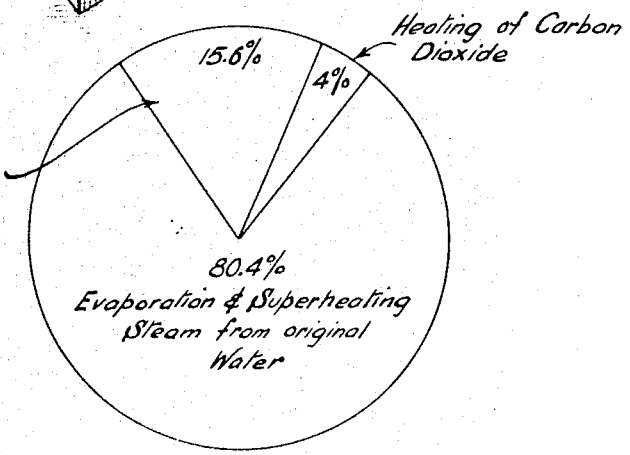
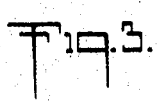
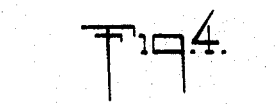
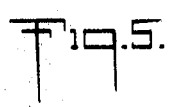
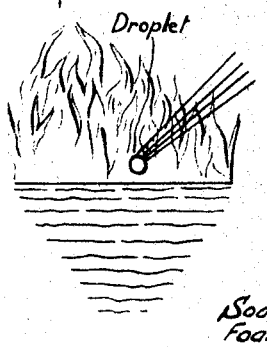
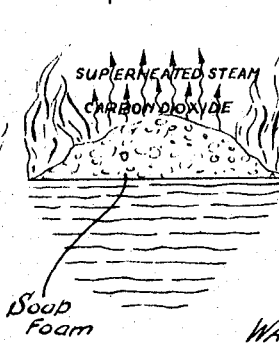
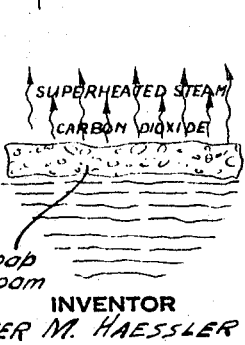
INVENTOR
WALTER M. HAESSLER
BY Edward V Connors
ATTORNEY 3,463,233
METHOD OF EXTINGUISHING DEEP FAT FIRES
Walter M. Haessler, Chatham, N.J., assignor, by mesne assignments, to Norris Industries, Inc., Los Angeles, Calif., a corporation of California
Filed May 15, 1967, Ser. No. 638,325
Int. Cl. A62c 35/52, 35/54; A62d 1/00
U.S. Cl. 169—1                              10 Claims

ABSTRACT OF THE DISCLOSURE

A range and hood is shown including a fire extinguishing fluid tank piped to discharge nozzles some of which are positioned over a deep fat receptacle, others being positioned adjacent filters in the plenum of the hood, and still others being placed in the duct. A temperature detecting system for release of the fire extinguishing fluid includes fusible links and cables. A manual release is also shown.

A method of extinguishing fire is disclosed in which a stream of aqueous alkali solution may be discharged into burning fat in the receptacle, in the filters or duct. The alkalis set out are potassium carbonate, sodium silicate, sodium hydroxide, dibasic potassium phosphate, tetrapotassium pyrophosphate, potassium acetate, and potassium hydroxide.

---

The present invention relates to the art of fire extinguishing, and more particularly to a method of extinguishing cooking fat fires such as in a range hood, duct, and associated cooking equipment.

In considering the nature of cooking fat fires, it will be noted that the flash point of the fats and oils used in cooking food is within the range of 450 degrees to 475 degrees Fahrenheit, the fire joint is at least 500 degrees Fahrenheit, and the auto ignition temperature is of the order of 600 to 650 degrees F. Generally speaking deep fat frying operations are carried out in the temperature range of 375 degrees F. to 400 degrees F. Thus, if the cooking operations are carried on at the proper temperature levels, there is no fire hazard in the use of the deep fat fryers. However, since there are many fires reported, their origins may be ascribed to overheated oil or to spontaneous combustion.

The overheated fat or oil may be caused by a defective thermostat or power relay, if the system is electric in operation. A gas heated deep fat fryer could similarly malfunction due to the failure of whatever means are used to control temperature and effect control over the gas flow. In either case the overheating of the fuel will cause the emission of acrid fumes containing a very pungent material known as acrolein, which is the dehydration product of glycerine emanating from destructive distillation of fat and oil. During work hours the odor would lead to immediate corrective measures being taken. However, at night when the kitchen help have gone home, such a situation would be fraught with fire danger.

It is obvious that the overheated oil may conceivably be ignited either by an open flame at a temperature above the fire point or without the presence of a flame at the autoignition point. Spontaneous combustion usually starts with a slow chemical reaction or a slow oxidation which generates some heat and under sufficiently hot conditions this process accelerates until rapid oxidation occurs. Conditions which promote dangerous heating are found in masses of materials that are not too tightly packed. Ventilation is an important factor in that at high levels of air movement sufficient cooling takes place to prevent temperautres reaching danger levels. On the other hand, complete lack of ventilation can be a positive deterrent to spontaneous combustion. Of extreme importance is the temperature at which the material is stored.

It is well known that the edible oils will heat spontaneously under certain conditions with the heating process continuing until the temperature of ignition is reached. The oils on the range filter are distributed over a large surface area of wire mesh metallic material which not only provides the large surface area but which may also provide a possible catalytic effect in assisting in the starting of a fire.

Both animal fat and vegetable oil, whether saturated or unsaturated, are glycerides of the basic fatty acids. Upon prolonged heating, particularly in the case of the unsaturated oils, a dehydrogenation occurs in which for every hydrogen molecule emitted, one extra "double bond" is created transferring the oil into a more unsaturated condition. Upon continued heating more dehydrogenation occurs and the resulting products become more and more unsaturated and hence more and more oxygen reactive. This process is identically what takes place when raw linseed oil is "boiled." Actually the linseed oil is not boiled but is only heated to approximately 240 degrees F. This boiled oil is much more reactive and when used in paint will more quickly polymerize into a hard film. This polymerization through the instrumentality of oxygen addition can very easily be demonstrated by the increase of weight of a paint film as it dries. Boiled oil is usually fortified even further with metallic oxidants to increase further drying action. Another commercial example of this phenomenon is in the manufacture of linoleum wherein boiled linseed oil together with other allied and similarly unsaturated oils are made to flow over fabric in heated locations thereby resulting in the formation of films similar to those obtained in the paint industry. A similar process occurs in nature in the formation of resins and gums being formed from tree sap which contains unsaturated oils. This general process wherein hydrogen is emitted, and double bonds obtained with subsequent absorption of oxygen at the double bond locations results in a cross-linking type of polymerization. The oxygen addition in this process of "resinification" is exothermic and under certain conditions of heating, such as are obtained when a rag is soaked in boiled oil and kept in a closed box may produce fire without benefit of kindling. It is literally pyrophoric. Oils of this type, vaporized from a range top become deposited in a very extended thin layer over the metallic filter surfaces. At temperatures of the order of 150 degrees F. to 250 degrees F. the oils constitute a very distinct fire hazard.

This type of fire obviously can start spontaneously depending upon the temperature of the filter. Obviously, with the blowers in action a large quantity of air serves to keep the filter in a cool condition and when the filters are in this state they do serve to condense the greasy vapors. However, upon closing down for the day at which time the blower is turned off, a condition exists very similar to that experienced with an automobile; namely, that the engine is at its hottest condition immediately after shutdown with very little circulation of air or cooling fluid. An analogous situation exists with the range hood filter. The amount of rise of temperature of the filter upon shutdown of the blower is obviously subject to very wide fluctuations but it would serve to explain the occurrence of these fires during off hours particularly in view of the fact that the dehydrogenation and resinification process results in the oils having lower flash points, fire points, and autoignition temperatures. Hence the filter becomes a very real fire hazard.

Heretofore cooking fat fires have been extinguished by the use of carbon dioxide, dry powder, or a combination of both as the fire extinguishing agent. As will appear hereinafter such extinguishing agents have not been wholly satisfactory because the stored heat in the fat and hood causes reignition unless sufficient cooling is provided. Water would provide the desired cooling action but if discharged into the hot fat would spread the fat and thus the fire in an explosive manner because of the rapid rate at which steam is formed by contact of the water and hot fat.

The present invention provides a method of extinguishing deep fat fires which involves the application of an aqueous alkali solution to the hot fat, the reaction resulting in the formation of a soap foam and steam so as to cool the hot fat and extinguish the fire by blocking oxygen therefrom.

In the drawings:

FIGURE 1 is a schematic showing of a range and hood with a fire extinguishing systems and control therefor.

FIGURE 2 illustrates a drop of fire extinguishing fluid passing through flames to hot fat.

FIGURE 3 shows the drop of FIGURE 2 below the surface of the fat and changed to a soap foam bubble.

FIGURE 4 shows the soap foam bubble of FIGURE 3 rising to the surface and spreading under the flames.

FIGURE 5 shows a layer of soap foam over the hot fat and the flames extinguished.

FIGURE 6 illustrates the percentages of the forms of thermal absorption in graphical form.

Referring to the drawing there is shown in FIGURE 1 a typical range with a pair of hot fat receptacles on which a fire may be extinguished in accordance with the method of the invention. The range 10 may be provided with burners and ovens (not shown) as usual. Deep fat receptacles or fryers 12 and 13 are positioned on the top of the range 10 under a hood 14 having a plenum chamber 15, the entrance to the plenum chamber being covered by a filter 16. A vertically extending duct 17 leading from the plenum chamber 15 joins a horizontally extending duct 18 which leads to a fan chamber (not shown) where air and fumes from the hood 14 are exhausted to the atmosphere.

The fire extinguishing system includes a container 20 which is charged as described hereafter and pressurized in the usual manner. A discharge pipe 21 extends from valve 22 of the container 20 to nozzles positioned so as to protect the hazard. Twin nozzles 24 and 25 are located adjacent to each other but discharge in opposite directions. The nozzles discharge a solid wide angle spray. Nozzle 24 discharges into the ducts 17 and 18, while the nozzle 25 covers the entry area leading from the plenum chamber 15 to the duct 17 and a large portion of the discharge from the nozzle 25 is directed into the plenum chamber 15.

In addition nozzles 26 and 27 located adjacent to each other and in opposed relationship discharge solid and relatively narrow angle sprays longitudinally of the plenum chamber 15 and positioned in the center thereof. The spray from the nozzles 26 and 27 protects the plenum chamber 15 which is the space above the filters 16 confined by the hood 14.

Other nozzles 29 and 30 are located respectively over the deep fat fryers 12 and 13. The nozzles 29 and 30 provide solid wide angle sprays and are positioned centrally of the fryers and at a sufficient height so as to obtain full coverage without causing splashing of the hot fat. The nozzles 29 and 30 protect the areas below the filters 16. All of the nozzles are so arranged that the fire extinguishing agent is not dispersed away from the cooking area. The system operates whether or not an exhaust fan is in operation.

The fire extinguishing system may be actuated in any conventional manner such as by a temperature detecting system which is an interconnected system of fusible links, levers, and cables with associated pulleys. Upon fusing of the links the cable system is untensioned thereby releasing the contents of a small control cylinder 31 which actuates the valve 22 of the container 20. An auxiliary manual release 32 may be located at one side of the range 10 or wherever optimum accessibility is obtained. The valve 22 may be directly discharged by manipulation of a pull handle 34. In the event the range 10 is fueled by gas, a shutoff valve 35 positioned in gas supply line 36 may be closed by a pressure actuated mechanism 37 controlled by discharge of fluid from the container 20. Likewise, a shutoff switch might be actuated in the case of an electric range.

In a typical installation, the hood 14 may be about 20 feet long and 6 feet wide thus having an area of about 120 square feet and may be made of steel weighting about 400 pounds. The ducts 17 and 18 may total about 125 feet in length and have perimeters of about 100 inches thus having an area of about 100 square feet. It would not be unusual for such a range to carry about 15 pounds of fat in the hood 4, and about 165 pounds of fat in the ducts 17 and 18. Each of the deep fat fryers 12 and 13 may contain about 200 to 250 pounds of fat and each may present an area of five square feet about one foot in depth. Fat weighs about 50 pounds per cubic foot.

Both the metal and the fat hold about one quarter B.t.u. per pound per degree F. change. Thus if the eight hundred pounds of fat and hood were heated to 600 degrees F. it would require a heat dissipation of almost 48,000 B.t.u. to cool the fat and hood to a safe 360 degrees F. after the fat had been ignited.

It is because of the tremendous heat storage of the fat and hood that the carbon dioxide and dry powder fire extinguishing systems have not been wholly satisfactory. While both agents promptly extinguish the fire reflash will occur unless the fat and hood are cooled below the flash point of the fat. It has been found that about 35 pounds of carbon dioxide or about 30 pounds of powder are required. In a test on a five square foot fat fire a 75 pound carbon dioxide bottle was discharged at one and a half minutes to properly extinguish and cool the fat. A faster discharge rate would have spattered the fat and spread the fire.

In accordance with the invention a method of extinguishing hot fat fires is provided in which an aqueous alkali solution is applied to the fire preferably in the form of a spray. The application in the form of a spray is preferable to prevent splashing of the deep fat and to minimize the amount of solution required. The size of the spray openings is not critical as a solid stream of the solutions taught herein may be directed into hot burning deep fat without an explosive effect, although, of course, if too large a stream is used, fat will be forced out of its receptacle.

The alkaline spray upon contact with the burning fat or oil, be it located either at the deep fat frying area, the filter surfaces, or the walls of the plenum chamber or the duct will immediately result in the creation of a soap foam which is permeated with superheated steam and carbon dioxide. The low density of this foam will serve to cover the fat or oil and prevent further combustion.

The contact of these sprays with hot surfaces will cause the water content of the spray to be converted to steam and that following evaporation of the water, the steam becomes further superheated effecting a powerful cooling effect. This cooling effect is automatically proportional to the level of thermal involvement occurring i.e., the hotter the surfaces, the greater is the heat absorbed thereby.

The combined effect of the evaporation of water and the superheating of the resulting steam together with the carbon dioxide driven off from saponification reactions results in a tremendous reduction in free oxygen concentration.

Finally, the high alkaline nature of the sprays serves in a way to extinguish free flames in the well known effect on flames produced by alkali metal carbonates and bicarbonates in solid form as used in power extinguishers.

FIGURES 2 through 5 illustrate the saponification effect. In FIGURE 2 a droplet of the extinguishing agent is approaching a burning fat surface. If the fat is at its autoignition temperature which is approximately 620 degrees F., this droplet upon entering the fat will undergo a chemical and thermal reaction causing it to swell approximately 2200 times its original volume making a bouyant soap foam. Obviously myriads of these droplets are striking the surface and the net result is for the soap foam, which is aerated throughout with superheated steam, carbon dioxide, and glycerin vapors, to rise and spread across the burning surface as shown in FIGURES 3 through 5, and since this foam is relatively incombustible thereby separating the fat from the air. This action transpires not only on horizontal pools of burning fat but also on all vertical, horizontal, or inclined surfaces. As the soap foam separates, it releases trapped vapors which serve to assist the general blanketing action.

EXAMPLE NO. 1

|  | Percent by weight | Pounds per gallon |
|---|---|---|
| Potassium carbonate $K_2CO_3$ | 42.2 | 5.00 |
| Sodium dichromate $Na_2Cr_2O_7$ | 0.8 | 0.09 |
| Ethylene glycol $(CH_2)_2(OH)_2$ | 5.5 | 0.65 |
| Water | 51.5 | 6.09 |
| Total | 100.0 | 11.83 |

The sodium dichromate is a corrosion inhibitor and the ethylene glycol is a freezing point depressant.

The aqueous alkali solution of Example No. 1 is known as the "loaded stream" and has been used for many years as a fire extinguishing agent for class A fires. (Fires in ordinary combustible materials where the quenching and cooling effects of quantities of water, or solutions containing large percentages of water, are of first importance.) In the National Fire Protective Association Handbook of Fire Protection the loaded stream is classified for A fires only. (Class B fires are those in flammable liquids, greases etc. where a blanketing effect is essential. Class C fires are those in line electrical equipment where the use of an electrically nonconductive extinguishing agent is of first importance.

The saponification reaction is set out below and the quantitative data serves to give an idea as to the actual quantities involved. The quantitative data is based upon the full liquid contents of the system of four gallons which is discharged over a time interval ranging between 30 and 40 seconds.

It will be noted that a maximum amount of 86 lbs. of fat or oil, wherever it be located within reach of the sprays, is transferred into 93.4 lbs. of soap foam with an attendant emission of 6.4 lbs. carbon dioxide and 8.8 lbs. of glycerin. A very small amount of water, to the extent of 2.6 lbs. is consumed in this reaction. These are ultimate figures but they do give an idea of the maximum potential transformation of fat or oil to a relatively noncombustible soap.

The reduction of the thermal level of the fire by cooling to levels at which ignition cannot be sustained is shown in FIGURE 6 which portrays in a quantitative manner the total maximum potential heat absorption ability for a 4 gallon charge as well as a proportional distribution of the thermal absorption involved. Approximately 80 percent of the cooling action is achieved through the instrumentality of the evaporation and superheating of steam from the original water and that the remaining approximate 20 percent is shared in a four to one ratio between the evaporation and superheating of the glycerin, and the heating of the carbon dioxide respectively. These relationships are based upon an average environmental temperature of the order of 620 degrees F.

The soap from isolates fat from oxygen. At an average thermal level of 620 degrees F. there is an overall expansion of the agent from its original liquid form to a total volume of superheated steam, carbon dioxide and glycerin vapors with a 2130 to 1 expansion ratio. This huge evolution of vapors and gases depresses the oxygen concentration to virtually zero.

Other alkali solutions set out below have been investigated and tested for extinguishment of cooking fat fires. In making the tests using these other alkali compounds 100 cc. of cottonseed oil was placed in a 400 cc. beaker and heated to 710 degrees F. whereupon the oil was self ignited. From 3 to 4 cc. of solutions of the various alkali compounds were added. In case extinguishment was permanently obtained attempts were made to relight the fire by applying a flame to the extinguished oil. The alkali solutions and the results of the tests are set out in Table 1.

TABLE 1

|  | Formula | Concentration | pH | Extinguishment Yes | Extinguishment No |
|---|---|---|---|---|---|
| Sodium base: |  |  |  |  |  |
| (1) Sodium carbonate | $Na_2CO_3$ | 250 g./l. sat | 11.0 |  | x |
| (2) Trisodium phosphate | $Na_3PO_4$ | 90 sat | 11.7 |  | x |
| (3) Sodium tetraborate | $Na_2B_4O_7$ | 110 sat | 9.2 |  | x |
| (4) Sodium silicate | $Na_2O.4SiO_2$ | 42° Bé; not sat | 11.1 | x |  |
| (5) Sodium hydroxide | NaOH | 500 not sat | 13.5 | x |  |
| Potassium base: |  |  |  |  |  |
| (6) Potassium carbonate | $K_2CO_3$ | 600 not sat | 12.3 | x |  |
| (7) Diabasic potassium phosphate | $K_2HPO_4$ | 500 sat | 9.3 | x |  |
| (8) Tetrapotassium pyrophosphate | $K_4P_2O_7$ | 500 sat | 10.7 | x |  |
| (9) Potassium acetate | $KC_2H_3O_2$ | 600 not sat | 11.0 | x |  |
| (10) Potassium hydroxide | KOH | 500 not sat | 14.0 | x |  |

It will be noted that the concentrations of alkali used were not in excess of 600 grams per liter of solution. In some cases the alkali would not dissolve to this extent and a saturated solution at 70 degrees F. was used. Sodium silicate (water glass) is expressed as a density of 42 degrees Bé which is roughly equivalent to 600 grams per liter.

Solutions 1, 2 and 3 did not extinguish the fire, and produced explosive splashing. Solutions 4 through 10 successfully extinguished the fire by non-explosive formation of soap and steam and could not be reignited. It will be noted that in each case of successful extinguishment of the fire that the concentrations were over 400 grams per liter. (The solution of Example No. 1 is about 450 grams per liter.) In Table 1 the potassium carbonate solution was 600 grams to the liter.

The potassium compounds are more soluble and are generally more effective probably because of the greater amount of the compound in solution which results in the production of an adequate amount of soap simultaneously with the formation of steam thereby retaining the steam trapped in foam. In the case of solutions 1, 2 and 3 there was an insufficient amount of alkali compound in solution so that the steam formation was excessive for the soap resulting in explosive splashing. Of course, in the event sodium or potassium solutions are used safeguards against personnel hazards must be provided.

While the invention has been described and illustrated with reference to specific embodiments thereof, it will be understood that other embodiments may be resorted to without departing from the invention.

I claim:
1. The method of extinguishing fires arising from cooking fat contained in range vats or deposited on the surfaces of filters, collection chambers or exhaust ducts, and preventing reignition of the extinguished fires, which comprises directing a suitable aqueous alkali solution in the form of fine droplets over the exposed surface of the burning fat whereby the droplets by saponification produce a soap foam having a volume greatly in excess of the volume of the droplets, the saponification being greatly accelerated by the heat generated by the burning fat, the foam depriving the fire of a source of oxygen, and the heat concurrently converting water of the solution into steam permeating the soap foam, the steam exerting a cooling effect in the region where the combustion occurred, thereby reducing the temperature of exposed fat and immediately adjacent surfaces below a level at which ignition can be sustained.

2. A method of extinguishing cooking fat fires according to claim 1 in which the alkali solution includes potassium carbonate.

3. A method of extinguishing cooking fat fires according to claim 1 in which the alkali solution includes sodium silicate.

4. A method of extinguishing cooking fat fires according to claim 1 in which the alkali solution includes sodium hydroxide.

5. A method of extinguishing cooking fat fires according to claim 1 in which the alkali solution includes dibasic potassium phosphate.

6. A method of extinguishing cooking fat fires according to claim 1 in which the alkali solution includes tetrapotassium pyrophosphate.

7. A method of extinguishing cooking fat fires according to claim 1 in which the alkali solution includes potassium acetate.

8. A method of extinguishing cooking fat fires according to claim 1 in which the alkali solution includes potassium hydroxide.

9. A method of extinguishing cooking fat fires according to claim 1 in which the concentration of the alkali is greater than the equivalent of 400 grams per liter of solution.

10. The method as defined in claim 1 wherein the droplets are directed in the form of a gentle spray depositing the droplets with generally uniform and complete coverage of all surfaces where ignition is occurring, the ignited cooking fat is primarily a glyceryl ester of a fatty acid, and the alkali solution used has a pH of at least 9 to provide strong alkaline content especially adapting the solution to the rapid production of highly expanded soap foam.

References Cited

UNITED STATES PATENTS

| | | | |
|---|---|---|---|
| 1,271,506 | 7/1918 | Ferguson | 252—2 X |
| 1,813,367 | 7/1931 | Thompson | 252—2 X |
| 3,274,105 | 9/1966 | Mevel | 252—2 |
| 3,384,182 | 5/1968 | Rotvand | 169—1 |

FOREIGN PATENTS 1,196,080   7/1965   Germany.

M. HENSON WOOD, Jr., Primary Examiner

M. Y. MAR, Assistant Examiner

U.S. Cl. X.R.
169—4, 9; 252—2